United States Patent [19]

Yale

[11] 4,405,691

[45] Sep. 20, 1983

[54] TERBIUM ACTIVATED YTTRIUM GADOLINIUM OXYSULFIDE X-RAY PHOSPHOR AND SCREEN CONTAINING THE SAME

[75] Inventor: Ramon L. Yale, Ulster, Pa.

[73] Assignee: GTE Products Corporation, Stamford, Conn.

[21] Appl. No.: 291,756

[22] Filed: Aug. 10, 1981

[51] Int. Cl.$^3$ .......................................... C09K 11/475
[52] U.S. Cl. ................................ 428/690; 250/483.1; 252/301.4 S
[58] Field of Search ................. 252/301.4 S; 428/690; 250/483.1

[56] References Cited

U.S. PATENT DOCUMENTS 3,655,577  4/1972  Kano et al. .................... 252/301.4 S
3,738,856  6/1973  Masi ............................ 252/301.45 X

OTHER PUBLICATIONS

Manashirov et al., "Chem. Abstracts", vol. 91, 1979, 221080g.
Amiryan et al., "Chem. Abstracts", vol. 92, 1980, 32658m.
Aoki et al., "Chem. Abstracts", vol. 89, 1978, 83027a.
Kubo et al., "Chem. Abstracts", vol. 88, 1978, 82738a.

*Primary Examiner*—Jack Cooper
*Attorney, Agent, or Firm*—J. Theodosopoulos

[57] ABSTRACT

An X-ray phosphor consists essentially of $(Y,Gd)_2O_2S:Tb$ where the ratio of yttrium to gadolinium is between about 93/7 and 97/3.

3 Claims, No Drawings

TERBIUM ACTIVATED YTTRIUM GADOLINIUM OXYSULFIDE X-RAY PHOSPHOR AND SCREEN CONTAINING THE SAME

This invention concerns terbium activated yttrium oxysulfide X-ray phosphors. Such phosphors are disclosed in U.S. Pat. Nos. 3,738,856, 3,974,389 and 4,113,648.

U.S. Pat. No. 3,738,856 discloses that $Y_2O_2S$:Tb is faster than prior art X-ray phosphors. The patent also discloses that the phosphor coating on an X-ray conversion screen need not consist entirely of $Y_2O_2S$:Tb, because yttrium is so expensive. Thus, a major portion of the phosphor coating can consist of other less expensive phosphors in order to reduce the cost of the screen. The patent also discloses, at column 2, lines 45–49, that terbium activated gadolinium oxysulfide is not as fast as terbium activated yttrium oxysulfide. It is additionally disclosed, at column 3, lines 37–49, that gadolinium oxysulfide and yttrium oxysulfide may be used together to provide a combination which has a level speed over a very wide range of X-radiation quality values. For this purpose, the phosphor should consist of 7 to 30% yttrium oxysulfide, the balance being gadolinium oxysulfide. It is additionally noted that gadolinium oxysulfide is not notably less expensive than yttrium oxysulfide. Thus, to reduce cost, the yttrium gadolinium phosphor may be used in conjuction with other less expensive compositions. The patent does not disclose that a particular ratio of yttrium to gadolinium can yield a maximum X-ray intensifier screen brightness.

I have discovered that when gadolinium is used along with yttrium in the manufacture of a terbium activated oxysulfide X-ray intensifier phosphor, greater X-ray intensifier screen brightness can be obtained than from terbium activated yttrium oxysulfide alone. Optimum brightness is obtained from the following approximate formula:

$$(Y_{0.93}Gd_{0.07})_2O_2S:Tb.$$

A typical example for the formulation of $(Y_{0.93}Gd_{0.07})_2O_2S$:Tb is as follows:

| | |
|---|---|
| Yttrium Oxide | 209.2 g |
| Gadolinium Oxide | 25.27 g |
| Terbium Oxide | 1.495 g |
| Sulfur | 128.0 g |
| Sodium Carbonate, monohydrate | 186.0 g |
| Sodium Phosphate, monohydrate | 85.2 g |

These materials are thoroughly mixed by ball milling, hammermilling or some other form of intense blending. They are then heat treated in a suitable container or crucible for two to eight hours at a temperature from 1000° to 1300° C. The resultant cake of material is digested in hot deionized water to remove soluble sodium polysulfides and other fluxes. After washing to a neutral pH, the material is filtered, dried and sieved.

Several series of samples were prepared in order to establish the optimum yttrium-to-gadolinium ratio. The results are shown in Table I, where the X-ray screen brightness is reported as a precentage of that of a control sample containing only yttrium, no gadolinium.

TABLE I

| Y/Gd Ratio | 99/1 | 97/3 | 96/4 | 95/5 | 93/7 | 91/9 | 89/11 | 85/15 |
|---|---|---|---|---|---|---|---|---|
| Brightness % | 100 | 104.4 | 104.1 | 104.6 | 104.8 | 100.7 | 100.3 | 96.0 |

It can be seen that improved screen brightness is obtained when the ratio of yttrium to gadolinium is between about 97/3 and 91/9.

Brightness was determined by mixing the phosphor samples with a lacquer binder and depositing a uniform coating thereof on a mylar substrate to form a screen. The screen was then exposed to 80 KV excitation for 0.1 seconds. The optical density of each exposed and developed screen was then measured with a densitometer, from which the x-ray screen brightness was determined.

I claim:

1. An X-ray phosphor consisting essentially of (Y,Gd-$)_2O_2S$:Tb where the ratio of yttrium to gadolinium is between about 97/3 and 91/9 exhibiting greater brightness under X-ray excitation than said phosphor absent Gd or said phosphor having a ratio of yttrium to gadolinium that is not between about 97/3 and 91/9.

2. The phosphor of claim 1 consisting essentially of $(Y_{0.93}Gd_{0.07})_2O_2S$:Tb.

3. An X-ray screen having coated thereon the phosphor of claim 1.

* * * * *